United States Patent Office 3,423,329
Patented Jan. 21, 1969

3,423,329
METHOD OF PRODUCING ACROLEIN AND METHACROLEIN
Wilhelm Gruber, Darmstadt, Germany, assignor to Rohm & Haas, G.m.b.H., Darmstadt, Germany
No Drawing. Filed May 28, 1965, Ser. No. 459,892
Claims priority, application Germany, May 30, 1964, R 38,009
U.S. Cl. 252—437     6 Claims
Int. Cl. B01j 11/32

ABSTRACT OF THE DISCLOSURE

Oxidation catalyst for oxidizing olefins to aldehydes containing 5 to 60% bismuth, 15 to 65% molybdenum, 20 to 31% oxygen and up to 10% phosphorus in the form of bismuth, molybdenum and phosphorus oxides, and 1 to 30% by weight, based on the total weight of the oxides, sulfate ions, and preparation thereof.

---

This invention relates to improvements in the preparation of acrolein and methacrolein from propylene and isobutylene, respectively.

Various methods are known for the preparation of unsaturated aldehydes from olefins by oxidation with oxygen in gaseous phase in the presence of catalysts. The best known of such catalysts include those of copper, copper oxide, bismuth, phosphorous and molybdenum oxide. In order to increase the activity of copper and copper oxide catalysts and thus satisfy a prerequisite necessary for industrial use, it has already been proposed to add to them selenium or a promotor such as halogen, hydrogen halide or an organic halogen compound, for instance, isopropyl iodide or dibromopropane. However, satisfactory results have still not been obtained in this manner.

Thus, for example, the high molar ratio of olefin to oxygen indicated in German Patent 1,070,612 to be 8:1 to 10:1 and in German Patent 1,001,673 to be 6:1 when the olefin is propylene is inherently disadvantageous. Even if a 100% yield based on oxygen were possible, the propylene conversion would be considered extremely poor.

German Patent 1,129,150 discloses a method of producing acrolein and methacrolein from propylene and isobutylene, respectively, in which catalysts which contain bismuth, molybdenum, oxygen and in some cases also phosphorus are used, the relative quantities of these elements being indicated by the empirical formula

$$Bi_aP_bMo_cO_d$$

in which $a$ is a number from 0.5 to 18, $b$ is a number from 0 to 5, $c=12$ and $d$ is a number from 36 to 76. It is furthermore stated to be advisible that the olefin oxidation be carried out in the presence of steam. The molar ratio of olefin to oxygen is, to be sure, considerably better than in the afore-mentioned German Patents 1,070,612 and 1,001,673, i.e., preferably between 1:5 and 1:0.5. For the conversion of propylene into acrolein, a preferred ratio of oxygen to olefin is indicated to be 1:1, but the yields are moderate. In accordance with the two examples given, 45 and 56.9%, respectively, of the propylene employed react in the propylene oxidation and the yields of acrolein, referred to react propylene, are 73.1 and 71.9%, respectively.

German Patent 1,125,901 suggests modifying the catalyst, which contains bismuth, phosphorus and molybdenum oxides, in such a manner that it also contains iron. As a result of this measure, the conversion referred to propylene, is increased to 70% and the selectivity is increased to 84%.

It has now been found that the preparation of unsaturated aldehydes of three to four carbon atoms, i.e., acrolein and methacrolein, by catalytic oxidation of the corresponding olefin of three to four carbon atoms, i.e., propylene and isobutylene, can surprisingly be substantially promoted and improved by depositing sulfate ions on the oxidation catalyst and contacting a gaseous mixture of oxygen and mono-olefin, preferably also steam, with the oxidation catalyst thus modified at a temperature within the range of about 250 to 600° C., preferably about 350 to 500° C., the molar ratio of olefin to oxygen being in the range of 2:1 to 1:2 and preferably at about 1:1.

The modification of the catalyst is readily accomplished by adding to it up to about 30 percent, based on the weight of active catalyst, of sulfuric acid or metal sulfate, e.g., cadmium sulfate, chromium sulfate, cerium sulfate, zinc sulfate, ferric sulfate, or the like, or a combination thereof. Sulfuric acid is preferred. The minimum concentration of sulfate ions in the catalyst is not particularly critical except to the extent that it should be sufficient, i.e., of the order of about one percent, to produce a significant improvement in results.

The active catalyst is preferably one prepared to contain 5 to 60 percent by weight bismuth, 15 to 65 percent by weight molybdenum, 20 to 31 percent by weight oxygen and, if desired, from 0 to about 10 percent by weight phosphorus. It can be prepared by adding an aqueous solution of ammonium molybdate or molybdic acid to a carrier material, such as colloidal silica, alumina, silicon carbide, titanium dioxide or clay which is inert under the reaction conditions, and thereupon adding a concentrated or dilute sulfuric acid or metal sulfate solution. Bismuth nitrate dissolved in dilute nitric acid then is added while agitating and the resultant mixture is evaporated to dryness and heated for about five hours at 500° C. After crushing the catalyst material which has been prepared in this manner, the particles having a size of 3 to 4 mm. can be used for oxidation in a stationary catalyst bed and the finer particles can be used for oxidation in a fluidized bed process.

The modification of the catalyst by treatment with sulfuric acid or a metal sulfate in accordance with the method of this invention makes possible maximum yields, in a single pass of propylene or isobutylene, of 63% acrolein and 46% methacrolein, respectively, referred to the amount of olefin introduced.

In addition to the advantage of higher yields, the catalysts as modified in accordance with the invention have the advantage of providing for a substantially more uniform oxidation. Consequently, the desired reaction temperature can be more easily maintained and controlled.

The performance of the catalysts known from Examples 1 and 2 of German Patent 1,129,150 and of the catalyst described in the examples of German Patent 1,125,901 was compared with the performance, under the same experimental conditions, of one of these catalysts as modified in accordance with the method of the invention. The catalysts were prepared as follows:

Catalyst A

A catalyst prepared as described in Example 2 of German Patent 1,129,150, i.e., by adding a solution of 9.3 cc. 85% phosphoric acid, 272 g. molybdic acid (85% $MoO_3$), 40 cc. nitric acid and 582 g. bismuth nitrate in 400 cc. water to 750 g. of an aqueous solution of a colloidal silica gel that contains 30% by weight silicic acid, drying the mixture for 16 hours at 538° C., and then grinding it to particles having sieve sizes of from 235 to 2860 meshes per cm.²

Catalyst B

A catalyst prepared as described in Example 1 of German Patent 1,129,150, i.e., by adding a solution of 170 g. molybdic acid (85% $MoO_3$) in 150 cc. water to 1330 g. of an aqueous, colloidal silica gel containing 30% by weight silicic acid, then adding a solution of 364 g. bismuth nitrate, $Bi(NO_3)_3 \cdot 5H_2O$, 200 cc. water and 20 cc. nitric acid, drying the mixture, heating it for 16 hours at 538° C., and then grinding it to particles having sieve sizes of 235 to 2860 meshes per cm.²

Catalyst C

A catalyst prepared as described in the example of German Patent 1,125,901, i.e., by adding a solution of 218 g. $Bi(NO_3)_3 \cdot 5H_2O$ and 20 cc. conc. nitric acid in 150 cc. water and a solution of 182 g. $Fe(NO_3)_3 \cdot 9H_2O$ in 100 cc. water to 1600 g. of a 14% aqueous solution of colloidal silica gel, adding 11.8 g. of 85% $H_3PO_4$ and 173 g. $MoO_3$, drying the mixture while stirring, sintering at 460° C. for five hours in a current of air and then grinding it to a particle size of about 3 mm.

Catalyst D

Same as Catalyst A, but $H_3PO_4$ replaced by an equimolar amount of $H_2SO_4$.

Catalyst E

Same as Catalyst A, but $H_3PO_4$ replaced by an equimolar amount of $CdSO_4$.

Catalyst F

Same as Catalyst A, but $H_3PO_4$ replaced by an equimolar amount of $Cr_2(SO_4)_3$.

Catalyst G

Same as Catalyst A, but $H_3PO_4$ replaced by an equimolar amount of $Ce_2(SO_4)_3$.

Catalyst H

Same as Catalyst A, but $H_3PO_4$ replaced by an equimolar amount of $ZnSO_4$.

The comparative tests were carried out in the following manner:

The catalyst in question was filled, to a bed height of 5 cm., into a quartz tube provided with an externally wound heating coil and having an inside diameter of 2 cm.

A reaction gas mixture of 3 l.p.h. (liters per hour) propylene, 14.3 l.p.h. air (in the case of Tests 11 and 12, 21.5 l.p.h. air) and 5 l.p.h. steam was conducted over the catalyst. The reaction temperature at the catalyst was adjusted by means of the heating coil and measured with a thermocouple. Each of the tests was carried out for 5 hours.

The results are shown in the following table:

TABLE

| Test No. | Catalyst | Temp., ° C. | Propylene conversion, percent | Selectivity, percent | Yield of acrolein, in percent based on propylene feed |
|---|---|---|---|---|---|
| 1 | A | 400 | 1.6 | 80 | 1.3 |
| 2 | A | 440 | 33.5 | 64.2 | 21.5 |
| 3 | A | 460 | 27.5 | 62.5 | 23.4 |
| 4 | B | 400 | 3.2 | 50.6 | 1.6 |
| 5 | B | 460 | 38.7 | 36.0 | 13.9 |
| 6 | C | 400 | 4.0 | 74.5 | 3.0 |
| 7 | C | 460 | 38.3 | 62 | 23.7 |
| 8 | D | 400 | 10.5 | 95 | 9.9 |
| 9 | D | 440 | 40.4 | 85 | 34.3 |
| 10 | D | 460 | 48.6 | 74 | 35.9 |
| 11 | E | 380 | 21.8 | 90.7 | 19.7 |
| 12 | E | 420 | 32.1 | 70.2 | 22.5 |
| 13 | E | 420 | 27.8 | 95 | 26.4 |
| 14 | F | 420 | 32.7 | 74.3 | 24.3 |
| 15 | G | 380 | 15.9 | 83.2 | 13.2 |
| 16 | H | 400 | 12 | 80.5 | 9.6 |

The data in the table show that, at 460° C. maximum yields of 23.4%, 13.9% and 23.7% acrolein, referred to the propylene used, are obtained with Catalysts A, B and C, respectively, under the same reaction conditions. With Catalyst D, however, the yield is 35.9% acrolein, i.e., from 1.5 to 2.6 as great.

The advantages and preferred embodiments of the invention will become further apparent from the following examples.

EXAMPLE I (A) Preparation of the catalyst

A solution of 89 grams of ammonium paramolybdate in 300 ml. of water and 6.7 grams of 100% sulfuric acid were added to a suspension of 135 grams of Aerosil, a finely divided silicon dioxide, in 900 ml. of water. Thereupon a solution of 174.6 grams $Bi(NO_3)_3 \cdot 5H_2O$ with 48 ml. of conc. nitric acid in 300 ml. of water was added with agitation. This mixture was evaporated to dryness while agitating, and then heated for 5 hours in a muffle furnace at 500° C. The solid mass was crushed to particles of a size of 3 to 4 mm.

(B) Oxidation

A gaseous mixture of 15 l.p.h. of propylene, 71.5 l.p.h. of air and 20 l.p.h. of steam was conducted at 430° C. over 60 ml. of the catalyst particles described in Part A in a reactor. The propylene conversion was 73% with a selectivity of 86% acrolein. About 5% acetaldehyde and small quantities of acids were formed as by-products.

EXAMPLE II (A) Preparation of the catalyst 34.4 grams $(BiO)NO_3$ in 40 ml. of concentrated nitric acid, 1.38 grams 98% sulfuric acid and then 27.9 grams of molybdic acid (85% $MoO_3$) in 200 ml. of water were added to a suspension of 22.5 grams Aerosil in 50 ml. of water. This mixture was evaporated to dryness with agitation, then maintained for 5 hours at 500° C. and crushed to particles of a size of about 4 mm.

(B) Oxidation

A mixture of 3 l.p.h. of isobutylene, 22.5 l.p.h. of air and 30 l.p.h. of steam was conducted at 460° C. over 12 grams of the catalyst particles of Part A.

The isobutylene conversion was 54.5% and the yield of methacrolein 46%, corresponding to a selectivity of 84.4%.

EXAMPLE III

A catalyst containing molybdenum, bismuth and iron was prepared in the following manner:

To a suspension of 22.5 grams of finely divided silica in a solution of 27.9 grams of molybdic acid (85% $MoO_3$) in 400 ml. of water, there were added in succession a solution of 34.4 grams $(BiO)NO_3$ in 140 ml. of 29% $HNO_3$ and 4.86 grams of $Fe(NO_3)_3 \cdot 9H_2O$ with agitation. This mixture was concentrated to dryness with agitation and thereupon decomposed at 540° C.

A gaseous mixture of 3 l.p.h. of propylene, 15 l.p.h. of air and 4.5 l.p.h. of steam was conducted at 400° C. over 12 grams of the resultant catalyst in a quartz reactor having an inside diameter of 2 cm. The propylene conversion with a single pass was 40.5%; the yield of acrolein referred to the propylene used was 24.6%; i.e., the yield of acrolein referred to the reacted propylene was 60.7% of the theoretical yield.

The following examples demonstrate the advantage obtained with the use of iron sulfate instead of iron nitrate.

EXAMPLE IV

A catalyst prepared as described in Example III but to which, instead of $Fe(NO_3)_3 \cdot 9H_2O$, the same quantity of iron was added as ferric sulfate, gave under the same reaction conditions, the following results:

Propylene conversion: 33.3%,
Acrolein yield, referred to propylene used: 26.4%,

Acrolein yield, referred to propylene reacted: 79.3% of the theoretical yield.

EXAMPLE V

A catalyst prepared as described in Example III was modified by adding, as iron compound, 4.45 grams of $FeSO_4 \cdot 7H_2O$ instead of the ferric nitrate used in the said example.

A gaseous mixture of 3 l.p.h. of propylene, 15 l.p.h. of air and 4.4 l.p.h. of steam was conducted at 420° C. over 15 grams of the catalyst in the apparatus described above. In this 54.1% of the propylene used was reacted. The yield of acrolein, referred to the propylene used, was 46.4% of the theoretical yield and, referred to the reacted propylene, it was 85.6% of the theoretical yield.

EXAMPLE VI

A gaseous mixture of 3 l.p.h. of isobutylene, 22.5 l.p.h. of air and 41.6 l.p.h. of steam was conducted at 500° C. over 13.7 grams of the catalyst prepared in accordance with Example IV. 61.6% of the isobutylene used was converted. Methacrolein was produced in a yield of 44.4% of the theoretical yield, referred to the isobutylene employed, i.e., a selectivity of 72%.

I claim:
1. An oxidation catalyst containing 5 to 60 percent by weight bismuth in the form of bismuth oxide, 15 to 65 percent by weight molybdenum in the form of molybdenum oxide, 20 to 31 percent by weight oxygen in the form of said oxides, and from 1 to 30 percent by weight, based on the total weight of said oxides, of sulfate ions.

2. An oxidation catalyst as defined in claim 1 containing, in addition, up to 10 percent by weight phosphorus in the form of phosphorus oxide.

3. A process for preparing an oxidation catalyst which comprises adding sulfuric acid or a solution of cadmium, chromium, cerium, zinc or ferric sulfate to an aqueous solution of molybdic acid or ammonium molybdate, stirring in bismuth nitrate dissolved in dilute nitric acid and evaporating the resultant mixture to dryness, the relative proportions of said components being such that the dried mixture contains 5 to 60 percent by weight bismuth in the form of bismuth oxide, 15 to 65 percent by weight molybdenum in the form of molybdenum oxide, 20 to 31 percent by weight oxygen in the form of said oxides, 1 to 30 percent by weight, based on the total weight of said oxides, sulfate ions.

4. A process for promoting a catalyst consisting essentially of 5 to 60 percent by weight bismuth in the form of bismuth oxide and 15 to 65 percent by weight molybdenum in the form of molybdenum oxide which comprises depositing from 1 to 30 percent by weight, based on the total weight of said oxides, of sulfate ions on the catalyst.

5. A process for promoting a catalyst consisting essentially of 5 to 60 percent by weight bismuth in the form of bismuth oxide and 15 to 65 percent by weight molybdenum in the form of molybdenum oxide which comprises adding to the catalyst from 1 to 30 percent by weight, based on the total weight of said oxides, of sulfuric acid, cadmium sulfate, chromium sulfate, cerium sulfate, zinc sulfate, ferric sulfate, or a combination thereof.

6. A process as defined in claim 5 wherein sulfuric acid is added to the catalyst.

References Cited

UNITED STATES PATENTS

| | | | |
|---|---|---|---|
| 2,623,905 | 12/1952 | Pines et al. | 260—604 |
| 2,874,191 | 2/1959 | Foreman et al. | 252—437 |
| 2,941,007 | 7/1960 | Callahan et al. | 252—437 |
| 3,186,955 | 7/1965 | Callahan et al. | 252—437 |

FOREIGN PATENTS 242,007   12/1962   Australia.

OTHER REFERENCES

Derwent Belgian Patents Report, page A 14 (Pat. No. 605,502 abstract), published 1967.

PATRICK P. GARVIN, *Primary Examiner.*

U.S. Cl. X.R.

252—435, 436, 440; 260—604